United States Patent
Kausik et al.

(10) Patent No.: US 7,343,396 B2
(45) Date of Patent: Mar. 11, 2008

(54) PRECOMPUTATION OF WEB DOCUMENTS

(75) Inventors: Balas Natarajan Kausik, Los Gatos, CA (US); Janardhanan Jawahar, San Jose, CA (US)

(73) Assignee: Fineground Networks, Cupertino, CA (US)

( * ) Notice: Subject to any disclaimer, the term of this patent is extended or adjusted under 35 U.S.C. 154(b) by 800 days.

(21) Appl. No.: 10/459,365

(22) Filed: Jun. 11, 2003

(65) Prior Publication Data

US 2004/0073867 A1    Apr. 15, 2004

Related U.S. Application Data

(60) Provisional application No. 60/390,651, filed on Jun. 20, 2002.

(51) Int. Cl.
G06F 15/16 (2006.01)
G06F 13/00 (2006.01)

(52) U.S. Cl. ............... 709/217; 709/203; 709/219; 711/118; 711/133

(58) Field of Classification Search ........ 709/213–216, 709/224, 217, 219, 203; 711/118, 133
See application file for complete search history.

(56) References Cited

U.S. PATENT DOCUMENTS 5,878,223 A * 3/1999 Becker et al. ............... 709/223
5,892,937 A * 4/1999 Caccavale ................... 711/135
6,272,536 B1 8/2001 van Hoff et al.
6,539,382 B1 * 3/2003 Byrne et al. ................ 709/223
6,598,077 B2 * 7/2003 Primak et al. .............. 709/219
7,096,418 B1 * 8/2006 Singhal et al. .............. 711/133

FOREIGN PATENT DOCUMENTS

EP    0434041 B1    6/1991

OTHER PUBLICATIONS

H. Zhu, T. Yang, Class-based cache management for dynamic web content, Proceedings of the IEEE, Conference on Computer Communications (INFOCOM'01), Apr. 2001, http://www.cs.ucsb.edu/projects/swala/cache/2001.ps.*

* cited by examiner

*Primary Examiner*—Glenton B. Burgess
*Assistant Examiner*—Brendan Y. Higa
(74) *Attorney, Agent, or Firm*—Schwegman, Lundberg & Woessner P.A.

(57) ABSTRACT

Techniques are disclosed for anticipating a user's request for documents or other content from a server (typically via a URL), precomputing the anticipated content, and caching the precomputed information at a cache in proximity to the content server. The cache stores the response to the anticipated request, until the user requests the same content. The anticipated requests can be precomputed based on triggers reflecting users' historical access patterns.

24 Claims, 4 Drawing Sheets

| Trigger Class | Anticipation Class(es) | Anticipation Class Cache Life |
|---|---|---|
| www.homepage.com | www.homepage.com/level_j_page | 1 day |
| | www.thirdpartypage.com | 1 week |
| | ftp.homepage.com | 1 month |
| www.homepage.com/level_j_page | www.homepage.com/level_k_page | 1 day |
| | www.thirdpartypage.com | 1 week |
| | www.homepage.com | 12 hours |
| Etc. | Etc. | Etc. |

FIG. 3

PRECOMPUTATION OF WEB DOCUMENTS

CROSS-REFERENCE TO RELATED APPLICATION

This application claims the benefit of U.S. Provisional Application No. 60/390,651, filed Jun. 20, 2002.

FIELD

This patent relates generally to accelerating the serving of content, and/or reducing delays, in a networked computer environment. More specifically, this patent relates to serving generated web documents by precomputing certain dynamic content therein, without compromising freshness of the content.

BACKGROUND

It is commonly required to serve fresh content to web users, for example, in the form of web pages that are dynamically generated by formatting the latest content retrieved from a database. Examples of such content might include stock quotes, financial transaction data, price lists, news headlines, computer code, and still more. For instance, consider the case where a user visits an online bank. The user logs in, and after looking at his overall position, he might choose to look at his last ten transactions. The bank's server must retrieve the relevant content from its databases or other memory and construct a formatted response for the user to view. Since such archived content is typically (partly or wholly) unique to the user, even with modern database technology, a bank with millions of users would typically incur many seconds of delay in executing the database queries. Indeed, it is typical of each such query to take five seconds or more, even when the servers and the network are lightly loaded. Such delays are a result of latencies in the back-end infrastructure of the networked system, and are inherent in any large-scale system. As a result, users see poor performance.

In order to improve performance, caches are often installed in tandem with the content server. A cache is server or other mechanism that stores and provides content for re-use. By combining a server and a cache, static content that does not change with time can be offloaded to the cache, freeing up the content server to focus primarily on dynamic content. However, since dynamic content (such as transactional and personalized information) changes frequently and across users, it cannot readily be cached and re-used.

One known technique for improving performance of dynamic content involves pre-fetching of web content. For example, pre-fetching has been offered in a commercial implementation by Fireclick (see www.fireclick.com). In Fireclick's implementation, as soon as a user visits a web site, the web server downloads to the user's browser a small piece of software that contains the most popular browsing patterns at the web site. The software is typically a Java applet that executes on the browser in a transparent fashion. The applet downloads popular web content to the user's browser, in anticipation of the user's next request. The downloaded content may be that which other users most frequently download from the page which is currently displayed on the user's browser. For example, if the front page of a newspaper is being displayed, the stories behind the top headlines might also be downloaded. However, because such content has no guaranteed relation to the individual user's actual browsing habits, the network resources connecting the user's browser to the server, and the memory at the user's browser, are loaded with content that the user may not request.

BRIEF DESCRIPTION OF THE FIGURES

FIG. 3 illustrates an exemplary trigger class file, and an exemplary anticipation class file, usable with the proxy server of FIG. 2.

SUMMARY

We disclose techniques for anticipating a user's request for documents or other content from a server (typically via a URL), precomputing the anticipated content, and caching the precomputed information at a cache in proximity to the content server. The cache stores the response to the anticipated request, until the user requests the same content. The anticipated requests can be precomputed based on triggers reflecting users' historical access patterns.

The content can be computed on a user-by-user basis—rather than on a "most popular" basis across all users—on the basis of that user's history. The user's history can be dynamic, allowing the system can track the subsequent URLs most commonly requested by the user, from any given starting URL and/or at any given point in time.

We also disclose techniques for managing the freshness of the cached precomputed content. Thus, in another exemplary aspect, the cache can be configured so that precomputed content responsive to an anticipated URL request is stored only while such content is valid. Validity can be enforced by a variety of schemes such as a predetermined freshness interval set by the system administrator, or by the use of configurable triggers that allow cached content to be invalidated by other events.

Depending on configuration and implementation needs, the proposed system can (but need not) be deployed in a transparent manner, without necessarily requiring that changes be made to already deployed content servers, content, networks and/or browsers.

These and other aspects are described in greater detail below.

DETAILED DESCRIPTION

I. Operating Environment

Figure 1:
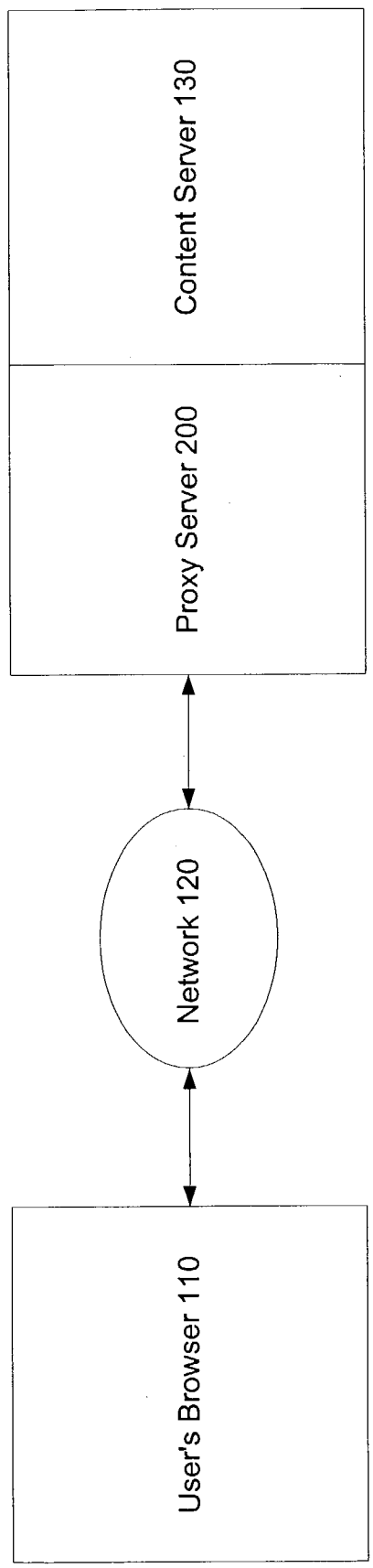
FIG. 1 illustrates an exemplary environment in which the techniques disclosed herein can be implemented as a proxy server.

FIG. 1 illustrates an exemplary environment including a user browser 110 connected over a network 120 to, and accessing content from, a content server 130. In an exemplary embodiment, the proposed system is deployed as a transparent proxy server 200 located on the network 120 in front of the content server 130. When the user 110 requests content from the content server 130, the request is first received by the proxy server 200, processed at the proxy server, and then sent to the content server 130. The proxy server 200 and/or content server 130 provide a response, which is processed and then returned to the user.

Figure 2:
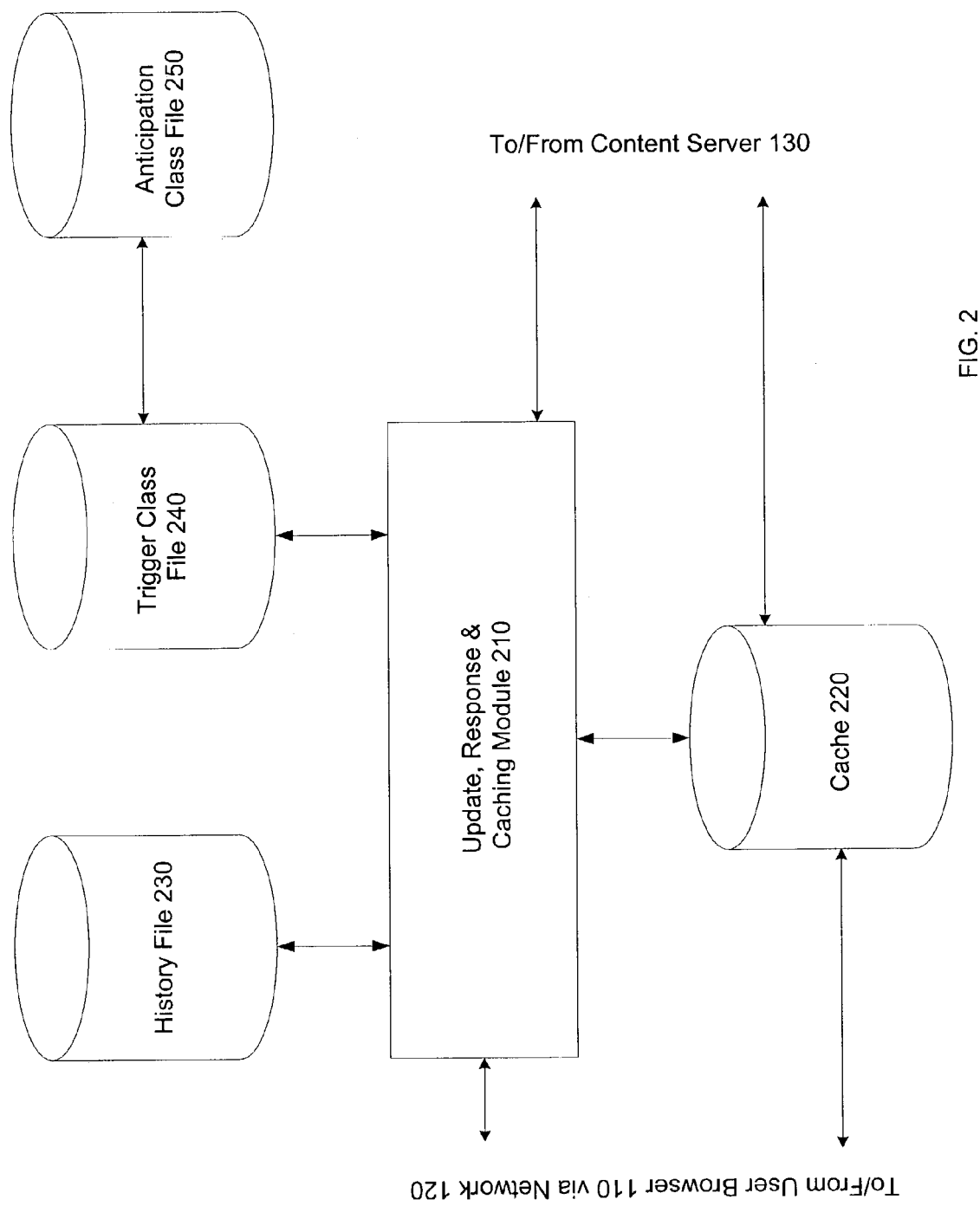
FIG. 2 illustrates an exemplary proxy server.

FIG. 2 illustrates an exemplary overview of proxy server 200 in schematic form. The proxy server may be a stand-alone server, or it may be an integral part of content server 130. If implemented as a stand-alone front end, the proxy server 200 can be deployed in a transparent manner, avoiding the necessity of making changes to already deployed content servers, content, networks and/or browsers.

In an exemplary embodiment, the functionality of proxy server 200 is deployed in updating, response, and caching module or subsystem 210 (or vice versa), which communicates with user browser 110 and content server 130. Module 210 (and other system components) may be implemented in an operating environment comprising software installed on a computer, in hardware, or in a combination of software and hardware. The software and/or hardware would typically include some type of computer-readable media which can store data and logic instructions that are accessible by the computer or the processing logic within the hardware. Such media might include, without limitation, hard disks, floppy discs, CDs, digital video discs, magnetic cassettes, tape cartridges, flash memory cards, random access memories (RAMs), read only memories (ROMs), and the like.

As a matter of convenience, the techniques of this patent will be disclosed in the exemplary context of a web-based system in which the user accesses content identified by URLs from a browser. However, those skilled in the art will readily appreciate that other user access devices, and content identifiers, may also be used. For example, instead of URLs, content may also be identified via other unique identifiers of an object, for example and without limitation, identifiers that identify the object as an entity per se, as opposed to a mere attribute (e.g., a web address) of an object.

Similarly, it should be appreciated that the disclosed techniques will operate on any networked computer, including without limitation, wireless networks, handheld devices, and personal computers. Therefore, exemplary terms such as web, browser, URL and the like should be interpreted broadly to include known substitutes and other equivalents, counterparts, and extensions thereof.

II. Proxy Server Functionality

Module 210 is in communication with a history file 230, which records the user's browsing habits. History file 230 may either comprise a stand-alone file specific to the proxy server, and/or a remote file located on the network and accessed by the proxy server (e.g., at the user's browser). Module 210 is also in communication with a cache 220, a "trigger class" file 240 and an "anticipation class" file 250. The operation of module 210 will be described in greater detail below with respect to FIGS. 3 and 4.

FIG. 3 schematically illustrates the content of an exemplary trigger class file 240 and anticipation class file 250. Although these have been shown as separate entities for the sake of illustration, they can also be combined into a single memory or database, as a matter of implementation choice.

1. Trigger and Anticipation Classes

The trigger class file 240 represents those URLs that are known or believed likely to be associated with subsequent requests for other URLs. The trigger class URLs may be determined in any desired fashion. For example, they can be statically specified by a system administrator and/or updated dynamically depending on the actual web access characteristics of the relevant user(s).

Each URL in the trigger class has an associated set of URLs representing known or otherwise anticipated follow-on requests associated with the triggering URL. These other URLs are known collectively as the anticipation class for the URL in the trigger class. The anticipation class may be determined in any desired fashion. For example, they can be statically specified by a system administrator and/or updated dynamically depending on the actual web access characteristics of the relevant user(s).

2. Exemplary Trigger and Anticipation Classes

Refer now to the meta-examples shown in FIG. 3. In this exemplary embodiment, both the trigger class file and the anticipation class file are user-specific. In other embodiments, of course, such files could be specific to classes of users, or to all users generally.

In the first meta-example shown in row 1 of the chart, the entry in column 1 (the trigger class) might include a home or login URL (e.g., www.homepage.com) where the user typically begins browsing content on content server 130. The entries in column 2 (the anticipation class) might represent the top other URLs typically visited by the user from the home URL (e.g., upon login). For example, assuming that system is configured to store the top three URLs, these might include a sub-page of the content server (e.g., www.homepage.com/level_j_page), a third party page (e.g., www.thirdpartypage.com) and even non-HTML content (e.g., downloadable content accessible via ftp from ftp.homepage.com).

In another meta-example shown in row 2 of the chart, the entry in column 1 (the trigger class) might include a sub-page of the content server (e.g., www.homepage.com/level_j_page), and the entries in column 2 (the anticipation class) might represent the other URLs typically visited by the user from the triggering URL. For example, these might include a different sub-page of the content server (e.g., www.homepage.com/level_k_page), a third party page (e.g., www.thirdpartypage.com), the home page (www.homepage.com), etc.

3. Updating Trigger and Anticipation Classes

The trigger and anticipation classes would typically be updated over time to reflect the evolving browsing preferences of the user. Thus, in the first meta-example above, when a user logs into a site for the first time, both the trigger class 240 and its associated anticipation classes 250 might be empty, since there are no data for that particular user. (Alternatively, default entries could be provided from browsing habits of similar users, or from all users generally).

As the user frequents the site, the system (via module 210 and data accumulating in history file 230) could update the trigger class with those visited URLs which typically spawn other URL requests (sometimes referred to as root URLs), and also update the anticipation class for each triggering URL with the URLs most frequently accessed therefrom.

For example, suppose that the current request for a URL makes the aggregate number of requests for that URL exceed a predetermined threshold. In that case, the requested URL may replace another URL as a member of the trigger class. The threshold may be absolute (i.e., such so that all URLs requested in excess of the threshold become trigger classes) or relative (e.g., such that the top n URL requests in any given period of time become the trigger classes).

Similarly, by comparing the requested URL with one (or more) previously requested URL(s), the proxy server can determine if any existing anticipation class should be updated with the currently requested URL.

4. Caching Anticipation Classes

The URLs in the anticipation class could then be cached at the proxy server in anticipation of future requests based on the corresponding URL in the trigger class. In this manner, the system may be able to respond from its cache 220, rather than always returning to the content server 130, for commonly requested content, thereby improving response time.

5. Precomputing Documents

If the responses corresponding to the URLs in the anticipation class are not yet cached, (e.g., because they represent personalized content, other forms of dynamic content, or otherwise have not yet been computed), they can be computed as necessary prior to caching.

Known techniques in which caches simply reuse responses from prior requests are not considered precomputing. Of course, this is not to say that such techniques can not be used in conjunction with precomputing. Depending on the situation, reusing prior responses may be a useful adjunct to precomputing.

6. Improving Cache Freshness

Because the anticipated URLs may change frequently, particularly for dynamic content, another element of the anticipation class specifies a cache lifetime (or validity interval) for each URL in the anticipation class. For example, as shown in column 3 of FIG. 3, these cache lifetimes might range hours to months, or otherwise.

Depending on implementation choices, a particular cache entry could either be purged, or ignored, or independently checked for freshness, once its cache lifetime has been reached. Thus, the system can (as necessary) fall back on the content server 130 to provide fresh responses.

The foregoing illustrates the use of a predetermined freshness interval set by the system administrator. However, many other techniques for ensuring validity can also be used. For example, the cache lifetime for a particular entry could be dynamic, if based on a configurable trigger that reflects the occurrence of other events. Still other validity enforcement techniques are disclosed co-pending U.S. patent application Ser. No. 10/287,364, filed on Nov. 4, 2002, which is hereby incorporated by reference in its entirety.

7. Improving Performance Under Load

Another aspect relates to performance under load. When the content server is under heavy load, precomputing anticipated URL's will add further load to the content server, thereby affecting performance adversely. To prevent such, the proxy server can monitor the load on the content server, and prorate the amount of precomputation accordingly. Specifically, the proxy server could measure the load on the content server: (a) by comparing the response time of the content server with an absolute and predetermined desired response time; (b) by comparing a short term moving average of the content server with a long-term moving average of the response time; or (c) using still other techniques. A full description of means for measuring the load on the content server is presented in co-pending application co-pending U.S. patent application Ser. No. 10/287,364, filed on Nov. 4, 2002, which is incorporated by reference in its entirety.

8. Remote History Storage

Some or all of a user's history file, including trigger classes and/or anticipation classes, may be stored in a database. In the case there are large number of users, the latency of such a database might in itself become significant. In such case, the user's history might be stored in compressed or indexed form as a cookie in the user's browser. As a result, the user presents the proxy server with the history cookie at each request, thereby making it readily available.

III. Exemplary Process Flow

Figure 4:
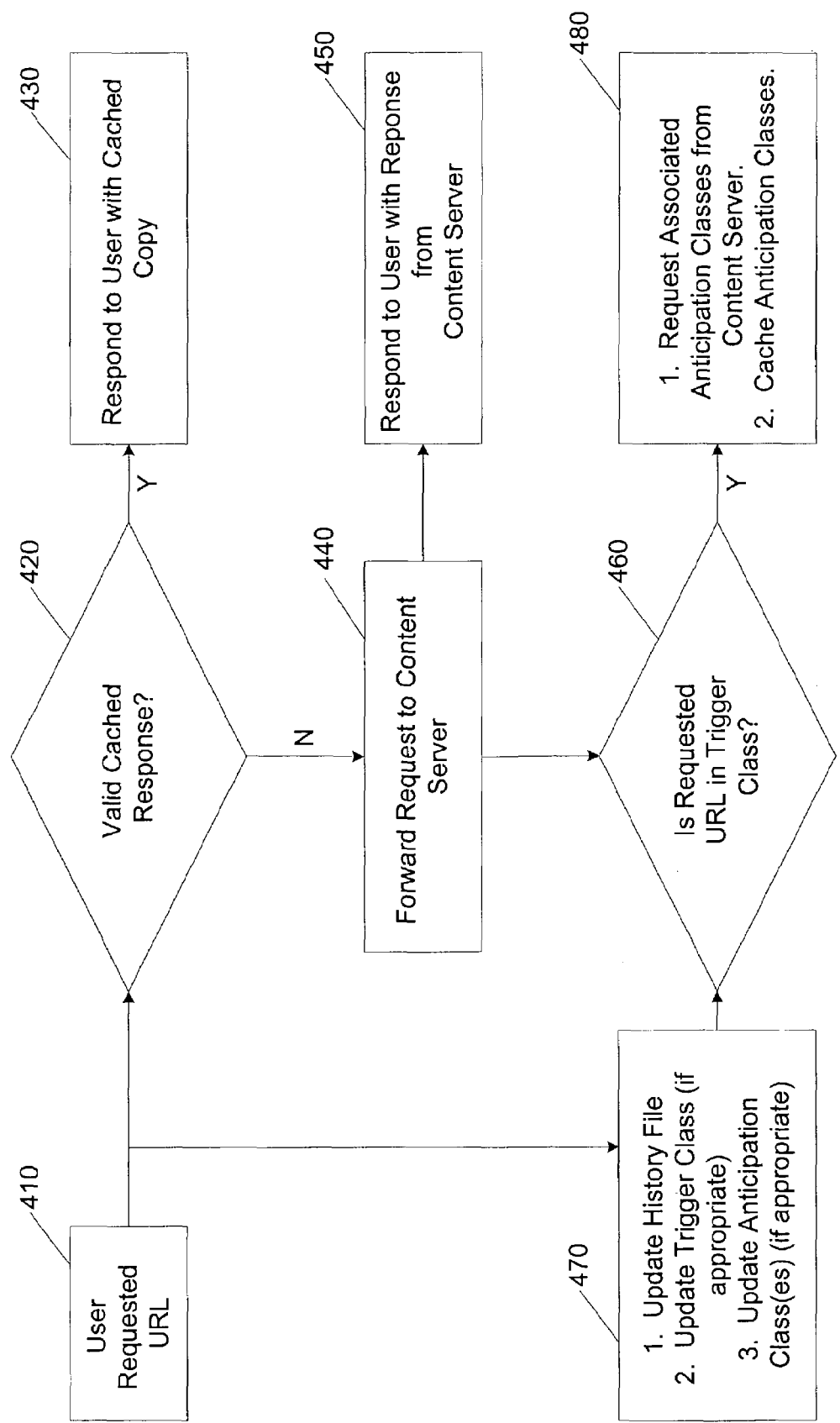
FIG. 4 illustrates an exemplary process for operating the exemplary proxy server of FIG. 2 using the exemplary files of FIG. 3.

FIG. 4 illustrates an exemplary process flow illustrating use of the exemplary proxy server of FIG. 2 with the exemplary files of FIG. 3.

At step 410, the proxy server 200 receives (e.g., intercepts) a user-requested URL. At step 420, the proxy server determines whether a valid copy of the desired URL is available from cache 220. If so, at step 430, the proxy server responds with the cached copy. If not, at step 440, the proxy server forwards the user's request to the content server 440. The content server responds with the requested URL, which is returned to the user at step 450. The foregoing paragraph illustrates basic cache operation, either with or without trigger and anticipation classes.

At steps 460-480, the use of trigger and anticipation classes facilitates the cache being efficiently loaded with content that is likely to satisfy future user requests. In this sense, the proxy server may be thought of as precomputing responses to user requests.

At step 460, if the user-requested URL falls within a trigger class (i.e., in trigger class file 240), the proxy server looks up the associated anticipation class (e.g., from anticipation class file 250), obtains the URLs in the anticipation class from the content server 130, and stores them in the cache. Depending on implementation choice, the proxy server could be configured to: (1) always request and store the URLs; (2) always request the URLs but only store them if they are not already in the cache; or (3) only request and store them if they are not already in the cache. In any event, the cache is thus updated based on a current browsing session with content that is likely to be useful in a future browsing session.

In addition to updating the cache, the user's browsing activity may also be updated and/or used to update the trigger and/or anticipatory classes. For example, at step 470, the user's request for a URL could be logged into history file 230. In one exemplary embodiment, the user's overall browsing history is used to determine the trigger class and associated anticipation classes. Thus, the updated browsing history is processed to determine any necessary changes in the URLs constituting the trigger class and anticipation classes, as described above in Section II.3.

When the user finishes accessing the current URL, and requests another URL, the process of FIG. 4 is repeated with the new URL. Depending on configuration choice, this could be done every time, or intermittently. If intermittently, suitable criteria for re-performing the process of FIG. 4 could include exceeding a threshold time, frequency, or other characteristic of the access session, or still other criteria specified according to a particular system configuration.

What is claimed is:

1. A method for improving the efficiency of document presentation, the method comprising:

precomputing dynamic content anticipated to be requested by a particular user computer from a content server;

storing said precomputed dynamic content in a cache at a proxy server between said content server and said user computer;

intercepting, at said proxy server, a request from said user computer to said content server for a document expected to include said dynamic content;

determining a load on said content server, and prorating an amount of precomputation based upon said load;

using said precomputed dynamic content in responding to said request from said user computer; and managing freshness of said precomputed dynamic content, said freshness determined by validity enforcement techniques.

2. The method of claim 1, further comprising determining freshness based upon said validity enforcement techniques which include finding a difference between a moving average of a response time and a desired response time in retrieving a cache value, starting with an initial response time and determining exponential growth of this initial response time up to an optional preset time limit so long as said moving average of said response time exceeds a desired response time, setting a manual expiry time for a cache value, and using an expiration of a cache value on a message board as a basis to determine an expiry time.

3. The method of claim 2, further comprising:
monitoring said load o a content server;and
prorating an amount of precomputation, said prorating occurring where a load on the content server is heavy.

4. The method of claim 1, further comprising:
maintaining a record of identifiers of documents deemed likely to trigger subsequent requests for dynamic content; and
maintaining a record of identifiers of documents deemed likely to comprise follow-on requests associated with a triggering document.

5. The method of claim 4, further comprising storing references, to at least some of said records, at said user computer.

6. The method of claim 4, where said record of identifiers of document are specific to particular users.

7. The method of claim 4, wherein said record of identifiers of documents deemed likely to trigger subsequent requests for dynamic content comprising a preexisting document.

8. The method of claim 4, wherein said record of identifiers of documents deemed likely to trigger subsequent requests for dynamic content comprising documents that are newly computed.

9. The method of claim 1, further comprising:
measuring a load on said content server; and
reducing precomputation during high load situations.

10. The method of claim 1, wherein said precomputed dynamic content in responding to said user's request includes:
determining whether said request falls within a trigger class and, if so;
determining one or more associated document(s) from an anticipation class associated with said trigger class; and
storing said associated document(s) in said cache.

11. The method of claim 1, further comprising repeating said method for another requested document.

12. The method of claim 1, where said load is measured by at least one of comparing a response time of said content server with an absolute and predetermined desired response time, or by comparing a short term moving average of said content server with a long-term moving average of said response time.

13. A computer-readable medium for improving the efficiency of document presentation, comprising logic instructions that when executed:
precompute dynamic content anticipated to be requested by a particular user computer from a content server;
store said precomputed dynamic content in a cache at a proxy server between said content server and said user computer;
intercept, at said proxy server, a request from the user computer to said content server for a document expected to include said dynamic content;
determining a load on said content server, and prorating an amount of precomputation based upon said load;
use said precomputed dynamic content in responding to said request from said user computer; and
manage freshness of the precomputed dynamic content, the freshness determined by validity enforcement techniques.

14. The computer-readable medium of claim 13, further comprising logic instructions that when executed determine freshness based upon said validity enforcement techniques which include finding a difference between a moving average of a response time and a desired response time in retrieving a cache value, starting with an initial response time and determining exponential growth of this initial response time up to an optional preset time limit so long as said moving average of said response time exceeds a desired response time, setting a manual expiry time for a cache value, and using an expiration of a cache value on a message board as a basis to determine an expiry time.

15. The computer-readable medium of claim 13, further comprising logic instructions that when executed:
maintain a record of identifiers of documents deemed likely to trigger subsequent requests for dynamic content; and
maintain a record of identifiers of documents deemed likely to comprise follow-on requests associated with a triggering document.

16. The computer-readable medium of claim 13, further comprising logic instructions that when executed:
measure a load on said content server; and
reduce said precomputation during high load situations.

17. The computer-readable medium of claim 13, further comprising logic instructions that when executed:
determine whether said request falls within a trigger class, and, if so;
determine one or more associated document(s) from an anticipation class associated with said trigger class; and
store said associated document(s) in said cache.

18. Apparatus for improving the efficiency of document presentation, the apparatus comprising:
means for precomputing dynamic content anticipated to be requested by a particular user computer from a content server;
means for storing said precomputed dynamic content in a cache at a proxy server between said content server and said user computer;
means for intercepting, at said proxy server, a request from said user computer to said content server for a document expected to include said dynamic content;
means for determining a load on said content server, and prorating an amount of precomputation based upon said load;
means for using said precomputed dynamic content in responding to said request from said user computer; and
means for managing freshness of said precomputed dynamic content, the freshness determined by validity enforcement techniques.

19. A proxy server for improving the efficiency of document presentation from a content server to a user, comprising:
a computational module for precomputing dynamic content anticipated to be requested by a particular user computer from a content server;

a cache for storing said precomputed dynamic content anticipated to be requested by said user computer and to manage said freshness of the precomputed dynamic content via validity enforcement techniques; and an interface connectable to said user computer and configured to:
- intercept a request from said user computer to said content server for a document expected to include said dynamic content;
- determine a load on said content server, and prorating an amount of precomputation based upon said load; and
- serve said precomputed dynamic content to said user computer.

20. The proxy server of claim 19, further comprising a data storage including:
   - a record of identifiers of documents deemed likely to trigger subsequent requests for dynamic content; and
   - a record of identifiers of documents deemed likely to comprise follow-on requests associated with a triggering document.

21. The proxy server of claim 19, implemented as party of said content server.

22. A method for improving the efficiency of document presentation, the method comprising:
   - precomputing dynamic content anticipated to be requested by a particular user computer from a content server;
   - storing said precomputed dynamic content in a cache at a proxy server between said content server and said user computer;
   - intercepting, at said proxy server, a request from said user computer to said content server for a document expected to include said dynamic content;
   - using said precomputed dynamic content in responding to said request from said user computer;
   - managing freshness of said precomputed dynamic content, said freshness determined by validity enforcement techniques; and
   - determining freshness based upon said validity enforcement techniques which include finding a difference between a moving average of a response time and a desired response time in retrieving a cache value, starting with an initial response time and determining exponential growth of this initial response time up to an optional preset time limit so long as said moving average of said response time exceeds a desired response time, setting a manual expiry time for a cache value, and using an expiration of a cache value on a message board as a basis to determine an expiry time.

23. A computer-readable medium for improving the efficiency of document presentation, comprising logic instructions that when executed:
   - precompute dynamic content anticipated to be requested by a particular user computer from a content server;
   - store said precomputed dynamic content in a cache at a proxy server between said content server and said user computer;
   - intercept, at said proxy server, a request from the user computer to said content server for a document expected to include said dynamic content;
   - use said precomputed dynamic content in responding to said request from said user computer;
   - manage freshness of the precomputed dynamic content, the freshness determined by validity enforcement techniques; and
   - determine freshness based upon said validity enforcement techniques which include finding a difference between a moving average of a response time and a desired response time in retrieving a cache value, starting with an initial response time and determining exponential growth of this initial response time up to an optional preset time limit so long as said moving average of said response time exceeds a desired response time, setting a manual expiry time for a cache value, and using an expiration of a cache value on a message board as a basis to determine an expiry time.

24. A method for improving the efficiency of document presentation, the method comprising:
   - precomputing dynamic content anticipated to be requested by a particular user computer from a content server;
   - storing said precomputed dynamic content in a cache at a proxy server between said content server and said user computer;
   - intercepting, at said proxy server, a request from said user computer to said content server for a document expected to include said dynamic content;
   - using said precomputed dynamic content in responding to said request from said user computer;
   - managing freshness of said precomputed dynamic content, said freshness determined by validity enforcement techniques;
   - determining freshness based upon said validity enforcement techniques which include finding a difference between a moving average of a response time and a desired response time in retrieving a cache value, starting with an initial response time and determining exponential growth of this initial response time up to an optional preset time limit so long as said moving average of said response time exceeds a desired response time, setting a manual expiry time for a cache value, and using an expiration of a cache value on a message board as a basis to determine an expiry time;
   - monitoring said load of a content server; and
   - prorating an amount of precomputation, said prorating occurring where a load on the content server is heavy.

* * * * *